United States Patent [19]

Birch et al.

[11] 3,975,879
[45] Aug. 24, 1976

[54] THERMAL INSULATION

[75] Inventors: William Birch, Holmes Chapel; Roger Alexander Stuart; Robert Ian Facer, both of Knutsford; John Graham Durston, Leftwich, all of England

[73] Assignee: The Nuclear Power Group Limited, Warrington, England

[22] Filed: Oct. 25, 1974

[21] Appl. No.: 518,200

[30] Foreign Application Priority Data
Oct. 31, 1973 United Kingdom............... 50718/73

[52] U.S. Cl.................................... 52/404; 176/87; 220/9 LG; 220/15; 52/573
[51] Int. Cl.² ...................... E04B 1/74; E04B 1/80; G21C 11/00
[58] Field of Search....... 52/404, 573, 410, 486–489, 52/245, 249; 110/1 A; 176/87; 220/9 LG, 15

[56] References Cited
UNITED STATES PATENTS

| 814,949 | 3/1906 | Edgar | 110/1 A |
| 3,109,206 | 11/1963 | Beam | 52/573 |
| 3,377,760 | 4/1968 | Waite | 52/410 |
| 3,517,850 | 6/1970 | Von Saldern et al. | 220/9 LG |
| 3,530,630 | 9/1970 | Samaga | 52/410 |
| 3,547,302 | 12/1970 | Jackson | 220/15 |
| 3,785,320 | 1/1974 | Bourgeois et al. | 220/9 LG |

Primary Examiner—Frank L. Abbott
Assistant Examiner—James L. Ridgill, Jr.
Attorney, Agent, or Firm—Holman & Stern

[57] ABSTRACT

A metallic wall clad with thermal insulation has a layer of insulating blocks spaced from the wall, the blocks being spaced apart and each block being individually and rigidly secured to the wall, the interspaces being substantially closed against convectional flow of liquid by resilient closure members, and a membrane covering for the layer of blocks, the covering having venting means to allow liquid from the vessel to penetrate between the covering and the wall.

9 Claims, 5 Drawing Figures

THERMAL INSULATION

BACKGROUND OF THE INVENTION

This invention relates to thermal insulation and is primarily directed to thermal insulation for use in liquid metal cooled nuclear reactor vessels.

PRIOR TECHNIQUE

In a known construction of liquid metal cooled nuclear reactor the reactor core and heat exchangers are submerged in a pool of liquid sodium within a primary vessel. The reactor core is surrounded by a barrier wall and liquid sodium circulates from the relatively cool outer pool upwardly through the core, thence through the heat exchangers and back to the outer pool. There is a temperature difference of approximately 200°C between the sodium of the outer pool and the sodium within the barrier wall and heat exchanger shells. Thermal insulation is, therefore, required for the barrier wall and heat exchanger shells to reduce thermal stresses and to reduce heat losses therethrough. Access to the primary vessel cannot be gained after the reactor has become operational and therefore, for commercial and safety reasons, the insulation must be of high integrity. Prior to the present invention, the preferred form of insulation comprised a series of thin, spaced barriers which created interlayers of substantially static sodium and the barriers comprised composite metal layers formed with sealed gas pockets to reduce thermal conductivity. However, some serious difficulties are foreseen with this form of insulation. Before commissioning the reactor installation, it is necessary to pressure test the primary containment structure and such a test could collapse some of the gas pockets since adequate internal support is difficult to provide. Also, before commissioning the reactor, it is desirable to carry out a hydraulic test on the primary circuit and there is a risk that water will be secreted in the gas pockets of the insulation and subsequently react with the sodium coolant or generate steam thereby pressurizing the pockets.

SUMMARY OF THE INVENTION

According to the present invention, a metallic wall is clad with thermal insulation comprising a layer of insulating blocks spaced from the wall, the blocks being spaced apart and each block being individually and rigidly secured to the wall, the interspaces being substantially closed against conventional flow of liquid by resilient closure members, and a membrane covering for the layer of blocks, the covering having venting means to allow liquid from the vessel to penetrate between the covering and the wall. The insulating blocks are spaced as closely as is practical while allowing for thermal expansions, erection tolerances and movements of the insulated wall. The closure members substantially prevent conventional flow of liquid between the layer of blocks and the wall and restrict exchange of liquid between the faces of the layer of blocks. The membrane limits the interchange of liquid flowing over the front face of the membrane with that trapped behind the membrane.

The invention has particular application to liquid metal cooled nuclear reactors wherein there is a temperature difference across the insulated wall of approximately 200°C. In such an application, the thermal expansion of the individual blocks is relatively small and is accommodated by the block interspaces and by the space between the wall and face of the layer of blocks. In the unlikely event of one or more blocks or other components becoming detached from the wall of the vessel, they are retained generally in position by the covering thereby avoiding the introduction of debris into the primary circuit of the reactor.

In a preferred construction of liquid metal cooled nuclear reactor the membrane covering is spaced from, and attached to, the layer of blocks and comprises a continuous stainless steel sheet which is ribbed in orthogonal pattern to give flexibility for the accommodation of thermal strain. The membrane is spaced from the blocks to provide an attenuating liquid metal layer to minimize the effects of rapid liquid metal temperature changes on the layer of blocks. In such a construction, the sheet may be cut away at the intersections of the ribs thereby to avoid complex stresses which may be set up on forming the sheet and by thermal expansion in use. Alternatively, the sheet may be generally impervious except for small perforations in the lower regions to enable liquid metal to enter the space between the sheet and the wall for commissioning purposes.

In an alternative construction, the membrane covering comprises a plurality of discrete membrane sheets carrying the interblock closure members, each sheet being individually secured to the associated insulating block, the sheets being arranged with overlapping edges so that in the event of an insulating block and discrete sheet combination becoming detached from the wall they are retained by the neighboring discrete sheets.

It is envisaged that the insulating blocks may be of solid material, for example, stainless steel, or be of cellular or porous material. Alternatively, the blocks may be hollow shells containing ceramic material or gas fillings.

Constructional embodiments of the invention will now be described, by way of example, with reference to the accompanying drawings wherein:

DETAILED DESCRIPTION OF THE EMBODIMENTS

Figure 1:
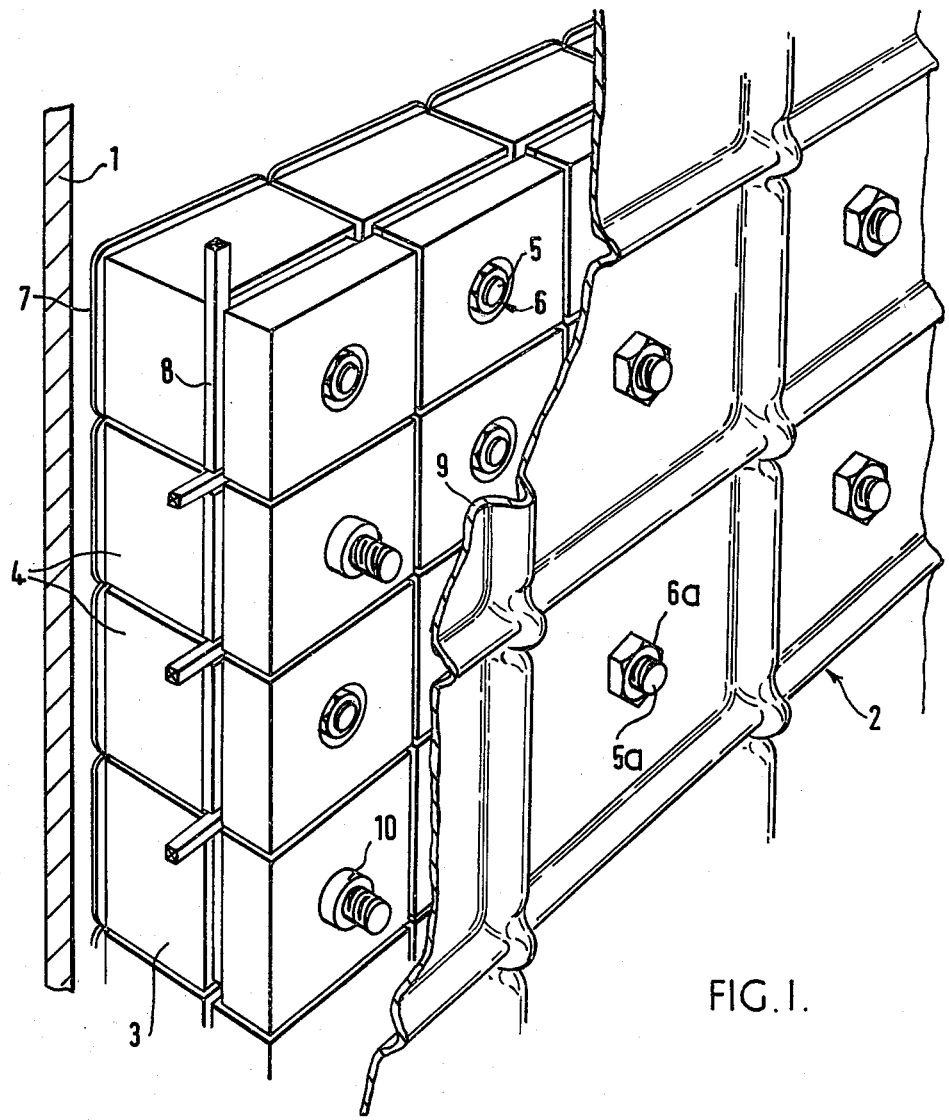
FIG. 1 is a fragmentary perspective view of a thermally insulated wall.
Figure 2:
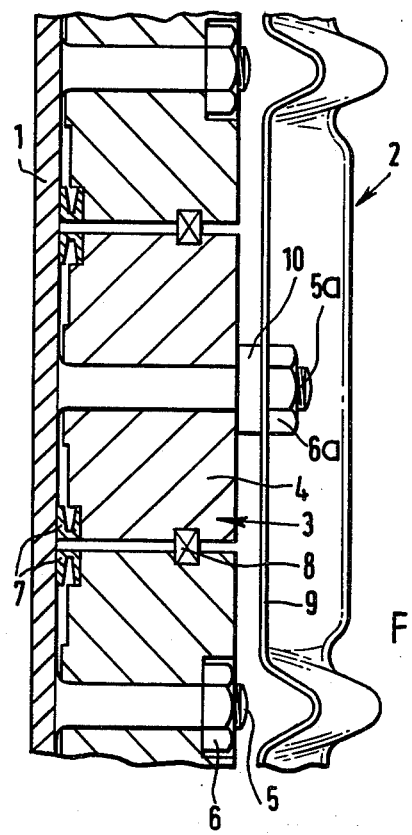
FIG. 2 is a fragmentary side view in cross-section.

FIGS. 1 and 2 show a wall 1 clad with thermal insulation denoted generally 2. The insulation comprises a layer 3 of spaced insulating blocks 4, each block being individually and rigidly secured to the wall by a central stud bolt 5 and nut 6. The stud bolts are welded to the wall 1. The block interspaces are substantially closed against conventional flow of liquid by resilient closure members 7, 8. The layer of blocks has a flexible membrane covering 9 which is spaced from the layer and, although not shown in the drawing, the membrane covering has small perforations in the lower regions to provide venting means for enabling liquid to penetrate the space between the covering 9 and the wall 4 thereby balancing the pressure across the covering.

Figure 3:
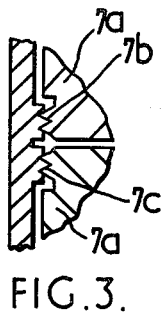
FIG. 3 is a fragmentary side view showing an alternative detail of FIG. 2.

The insulating blocks 4 are of stainless steel, are rebated at their rear faces and grooved on their side faces to house the resilient closure members 7 and 8 respectively. The closure members are formed from continuous strip of high temperature alloy steel, the rear member 7 being generally of C cross-section while the side members 8 are of X cross-section. The closure members 7 abut the peripheries of the block but the closure strips 8 must, of course, be interrupted at their crossover junctions. An alternative form of closure member 7a for the rear faces of the blocks comprises a sintered stainless steel openwork frame which is compressed into sealing engagement with sealing grooves 7c in the rear faces of the blocks 4 on assembly as illustrated in FIG. 3. The membrane covering 9 is of continuous stainless steel sheet which is ribbed in orthogonal pattern to give flexibility for the accommodation of thermal stresses. The covering is secured by extended block retaining stud bolts 5a and nuts 6a and is spaced from the layer of insulating blocks 4 by spacers 10.

The wall 1 forms a barrier between hot and relatively cool liquid sodium contained by a primary vessel of a liquid metal cooled nuclear reactor. The nuclear reactor core is submerged in the hot sodium and the flow of sodium is upwards through the reactor core to heat exchangers wherein heat is transferred from the reactor primary coolant to a secondary liquid metal coolant. The primary coolant then passes from the heat exchangers into the cool pool of liquid sodium. The temperature of the hot sodium is approximately 575°C and that of the cool sodium is approximately 400°C. The insulation is disposed within the hot sodium some of which penetrates the space between the membrane covering and the wall to form a layer of substantially static liquid sodium. Although the closure members do not necessarily completely seal the interspaces of the blocks, the closure is sufficient to prevent gross circulation of sodium by convection and thereby ensure an acceptably uniform wall temperature. The upper regions of the space between the layer of blocks and membrane covering lies above the free surface of the sodium in the primary vessel and is open to the atmosphere in the vessel.

Thermal expansion of the blocks is accommodated by closure of the block interspaces so that complex stresses in the layer of insulation are largely avoided. Variation of the width of the interspaces can be accommodated by the resiliency of the closure members so that the interspaces remain effectively closed against conventional flow of sodium. Superficial expansion of the membrane covering is accommodated by the orthogonal ribs so that high stresses in the covering are largely avoided. To reduce complex stresses in the covering, the intersections of the ribs of the covering may be cut away, in which case, the perforations in the lower regions of the covering may be omitted. The membrane covering serves also to retain in general position, a block or blocks 4 becoming detached from the wall 1 due to failure of securing stud bolts 5 in operation of the nuclear reactor installation thereby avoiding the danger of debris obstructing the flow path of coolant.

Figure 5:
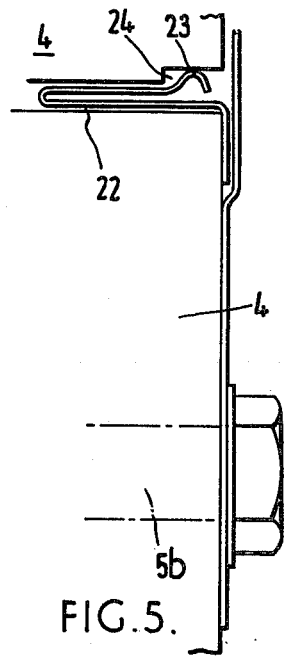
FIG. 5 is a detail of FIG. 4 shown in cross-section and to a larger scale.
Figure 4:
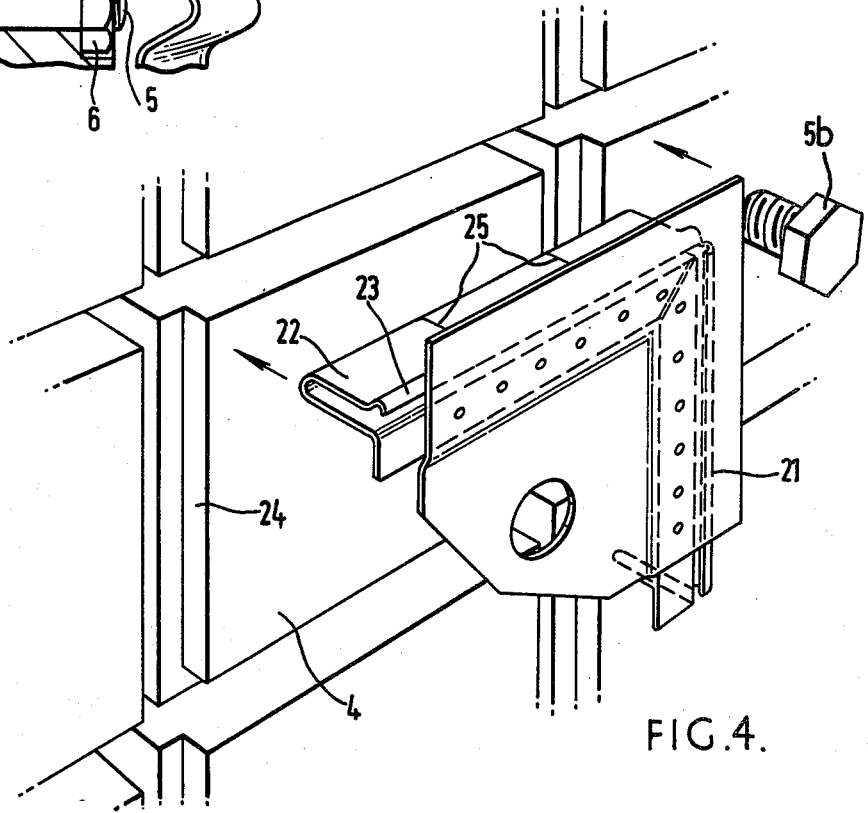
FIG. 4 is an exploded view of a second construction of thermally insulated wall.

In the alternative construction of thermal insulation shown in FIGS. 4 and 5, the insulating blocks are again individually secured to the wall of the vessel by hexagonal headed bolts 5b. The membrane covering in this construction comprises a plurality of discrete sheets 21 each of which is secured by the hexagonal headed bolt 5b of an associated block 4. The sheets 21 are arranged to overlap adjoining blocks at their edges as shown in FIG. 5 and carry closure members. The closure members (not shown in FIGS. 4 and 5) for the rear faces of the insulating blocks are generally similar to the closure members 7 described for the previously described construction as illustrated in FIG. 2 or, alternatively, closure members 7a as illustrated in FIG. 3. The closure members designated 22 in FIGS. 4 and 5 for side faces of the blocks are secured to the discrete sheets 21 by spot welding. The members 22 have the form of an elongate U cross-section with intermittent slits 25 for the relief of thermal stresses which could tend to bow the members. The elongate U extends into the space between blocks and has a lip 23 which abuts the side face of the block adjoining the one associated with the discrete sheet carrying the closure member, there being provided a rebate 24 for housing the lip 23. In this construction, the membrane covering is not spaced from the layer of insulating blocks 4 but liquid sodium can penetrate between the layer and the covering between the edges of the sheets. In the event of a bolt 5b becoming detached from the wall 1 in operation of the nuclear reactor installation, the associated insulating block 4 and discrete sheet 21 are retained in position by the neighboring blocks, closure members and discrete sheets.

Although solid stainless steel insulating blocks are believed to be adequate at this time, it is also envisaged that the thermal insulation properties may be improved by making the blocks of cellular material or the blocks may be formed of hollow shells containing ceramic material or inert gas. The insulating blocks are not necessarily of rectilinear form, they may be of any shape compatible with the geometry of the wall to be clad.

We claim:

1. A liquid metal cooled nuclear reactor vessel comprising a metallic primary containment vessel, the inside of which is lined by insulation defined by a layer of insulating blocks spaced from the wall of the vessel, the blocks being spaced apart and each block being individually and rigidly secured to the wall of the vessel, resilient closure members substantially closing the interspaces between the blocks against convectional flow of liquid, and a metallic membrane covering for the layer of blocks, the covering having venting means to allow liquid from the interior of the vessel to penetrate between the covering and the wall of the containment vessel to facilitate pressure testing of the reactor construction and prevent water, used during hydraulic pre-commissioning tests, from being secreted in gas pockets in the insulation.

2. The reactor vessel as claimed in claim 1, wherein the insulating blocks are composed of cellular or porous material.

3. The reactor vessel as claimed in claim 1, wherein the blocks are hollow shells containing ceramic material or gas fillings.

4. The reactor vessel as claimed in claim 1, wherein the membrane covering comprises a plurality of discrete membrane sheets carrying the interblock closure members, each sheet being individually secured to the associated insulating block, the sheets being arranged with overlapping edges so that in the event of an insulating block and discrete sheet combination becoming detached from the wall they are retained by the neighboring discrete sheets.

5. The reactor vessel as claimed in claim 1, wherein the insuating blocks are composed of solid material.

6. The reactor vessel as claimed in claim 5, wherein the blocks are composed of stainless steel.

7. The reactor vessel as claimed in claim 1, wherein the metallic membrane covering is spaced from, and attached to, the layer of blocks and comprises a continuous stainless steel sheet, said sheet being provided with ribs in orthogonal pattern to give flexibility for the accommodation of thermal strain.

8. The reactor vessel as claimed in claim 7, wherein the sheet is cut away at the intersections of the ribs thereby to avoid complex stresses which may be set up on forming the sheet and by thermal expansion in use.

9. The reactor vessel as claimed in claim 2, wherein the sheet includes lower regions, said sheet being generally impervious except for small perforations in the lower regions to enable liquid metal to enter the space between the sheet and the wall, the small perforations constituting said venting means.

* * * * *